United States Patent
Neff

(10) Patent No.: US 7,821,707 B2
(45) Date of Patent: Oct. 26, 2010

(54) DRIVE SYSTEM USEFUL IN A NIGHT VISION DEVICE

(75) Inventor: Todd Michael Neff, Salem, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 550 days.

(21) Appl. No.: 11/923,130

(22) Filed: Oct. 24, 2007

(65) Prior Publication Data

US 2009/0231742 A1 Sep. 17, 2009

(51) Int. Cl.
*G02B 23/00* (2006.01)
(52) U.S. Cl. ...................................... 359/407
(58) Field of Classification Search ................. 359/407, 359/381, 601, 614
See application file for complete search history.

(56) References Cited

U.S. PATENT DOCUMENTS

| | | | |
|---|---|---|---|
| 1,357,585 A | 11/1920 | Newton | |
| 4,601,552 A | 7/1986 | Jessmore | |
| 6,075,661 A | 6/2000 | Gross et al. | |
| 6,459,844 B1* | 10/2002 | Pan | 385/140 |
| 7,050,226 B2* | 5/2006 | Hengst et al. | 359/418 |
| 2002/0075394 A1 | 6/2002 | Fuchimukai | |
| 2005/0157285 A1* | 7/2005 | Schothorst et al. | 355/71 |
| 2006/0274435 A1 | 12/2006 | Nomura et al. | |
| 2007/0081238 A1 | 4/2007 | Gebelein | |

* cited by examiner

*Primary Examiner*—Joshua L Pritchett
(74) *Attorney, Agent, or Firm*—RatnerPrestia

(57) ABSTRACT

A drive system for optical components particularly useful with night vision devices. The drive system uses a single motor to rotate a selected one of two components between its operative and inoperative positions while retaining the other component in its inoperative position.

12 Claims, 5 Drawing Sheets

DRIVE SYSTEM USEFUL IN A NIGHT VISION DEVICE

STATEMENT REGARDING FEDERALLY SPONSORED RESEARCH

This invention was made under U.S. Government Contract Number FA8650-03-C-5943 and the United States Government may have certain rights in this invention.

BACKGROUND OF THE INVENTION

This invention relates to a drive system and more particularly to a drive system useful in, among other things, a night vision device for rotating one of a plurality of optical components into an operative position with respect to the night vision device.

Night vision devices include binoculars or monoculars that are used for intensifying low levels of ambient light to enable the user to see in the night. These devices generally include an image intensification tube having an objective lens that receives ambient light which is intensified by the image intensification tube and presented to the user. Night vision devices are well known in the art and may be hand carried or mounted to a helmet or a head mounted harness, worn by the user, to facilitate their use by soldiers in various vehicles or on the ground.

Image intensification tubes are susceptible to interference from laser light and in some cases the tube can be damaged by laser light.

To protect the night vision device from laser light, it is known to use a single laser interference filter that is operatively arranged with the objective lens to protect the image intensification tube from the effects of laser light. See for example U.S. Pat. No. 6,075,661 issued on Jan. 13, 2000 to Ted J. Gross et al. In the Gross patent there is provision for a single laser interference filter that fits over the free end of the objective lens to filter laser light. It has been found that a single laser interference filter is not completely satisfactory and that a filter system including two filters is, in some situations, preferable to protect the image intensification tube. Each of these two filters has a different filtering capability such that one or the other is best used depending on the characteristics of the laser light, e.g., its wavelength or its power density, whether it is continuous or pulsed and other like characteristics. The filters are stowed in an inoperative position in which they are out of the path of the ambient light. When a filter is needed, the desired filter is selected and is driven to an operative position adjacent the objective lens to protect the tube. The other filter is retained in an inoperative position.

Providing a drive system or actuator for moving the selected filter to its operative position can be accomplished by the use of two motors, one for each filter, whereby the selected filter is moved by energizing it associated motor. Such arrangements are rather expensive, bulky and heavy. Accordingly, it is desirable to have an inexpensive, light weight arrangement for actuating the selected filter.

SUMMARY OF THE INVENTION

A drive system comprising a housing and a screw rotatably mounted therein. A nut is operatively arranged on the screw for movement axially along the screw; and, a pair of optical components each having a rotatable sleeve are carried in the housing adjacent the nut. A pin is provided adjacent each end of the nut and a track is provided along the axial length of each sleeve. Each pin is operatively arranged with a different one of the tracks. Each track is configured so that upon axial movement of the nut, one pin holds one sleeve against rotation and the other pin rotates the other sleeve whereby the optical component associated with the other sleeve rotates from between a first and second position.

DETAILED DESCRIPTION OF THE INVENTION

Figure 1:
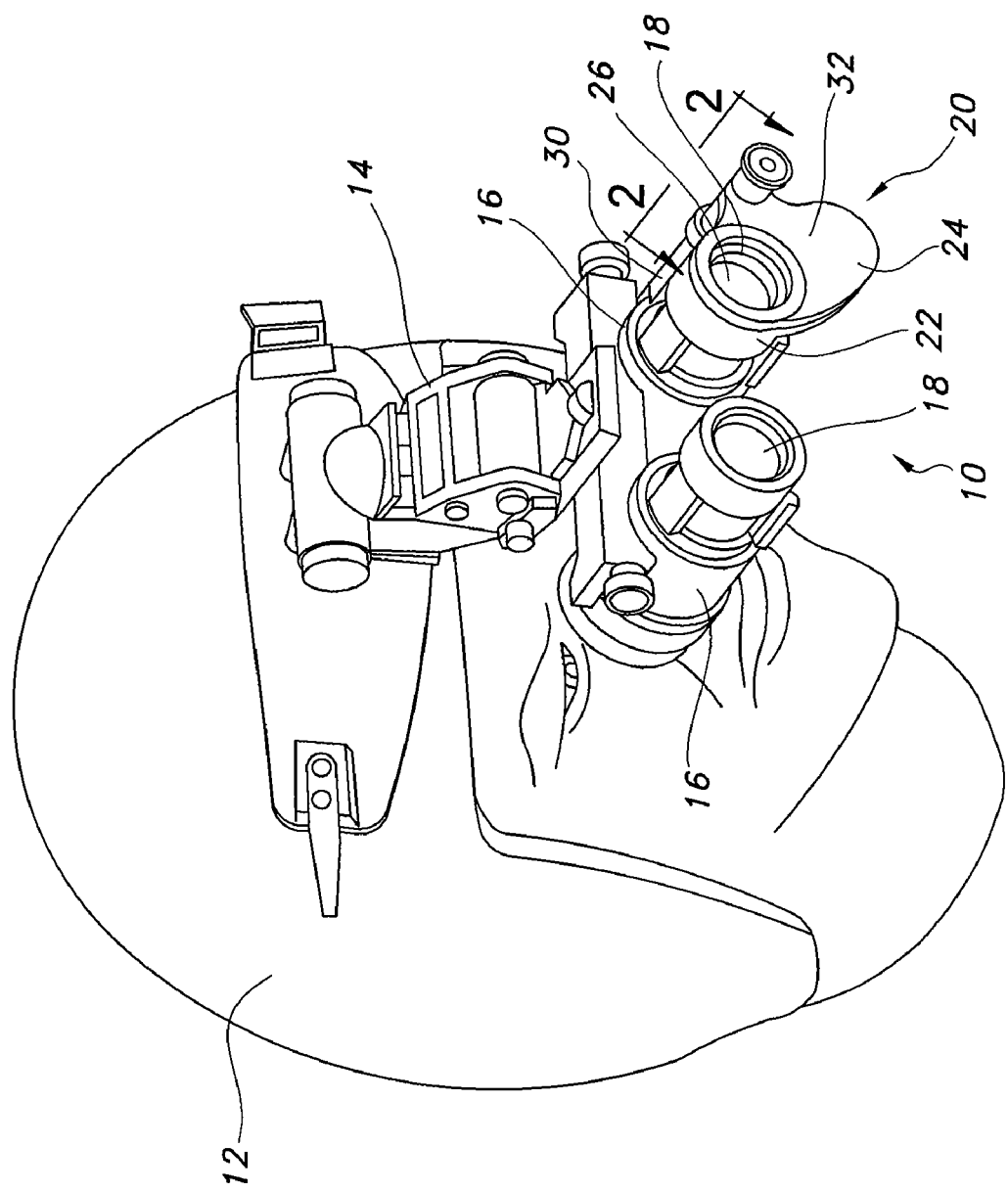
FIG. 1 is a perspective view illustrating a helmet mounted night vision binocular device including a laser interference filter and drive system in accordance with this invention.

Referring to FIG. 1 there is illustrated a night vision device in the form of a binocular 10 mounted on a helmet 12 by any suitable mounting arrangement shown generally at 14. The helmet 12 is, of course, worn by a soldier, either a field soldier or pilot or other vehicle driver utilizing night vision equipment. It should be understood that the drive system according to this invention is useful with other apparatus including monoculars that are either hand held or mounted to a weapon. The binocular 10 includes a pair of monoculars 16, 16 which can be any image intensification device, thermal night vision device or other useful night vision device. Each monocular, 16, 16 includes an objective lens 18 and an image intensification tube (not shown). Such image intensification tubes are well known in the art and are operative to intensify the low levels of light received on the free end of the objective lens 18 and provide a visible image at eyepieces which is viewed by the user.

Each monocular 16, 16 includes a laser interference filter assembly 20 (only one of which is shown in FIG. 1). Each filter assembly 20 is the same and each includes a housing having a first generally cylindrical portion 22 of a size and shape to fit on the monocular 16 around the objective lens 18. The filter assembly 20 housing is retained with its associated monocular 16 by any suitable fastening arrangement between the cylindrical portion 22 and the monocular housing adjacent the free end of the objective lens 18.

Figure 3:
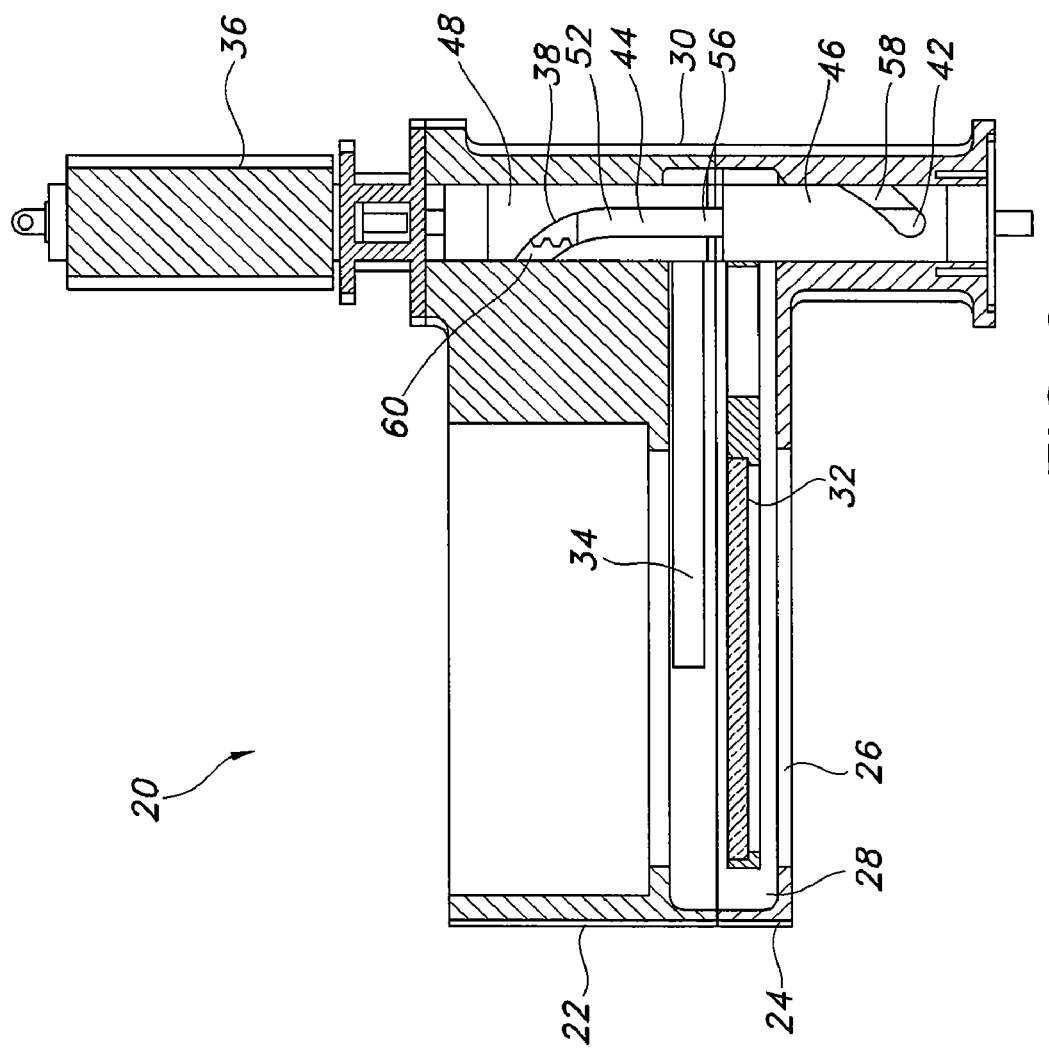
FIG. 3 is a top view, partially in section illustrating the drive system according to this invention with the filters in their inoperative positions.
Figure 4:
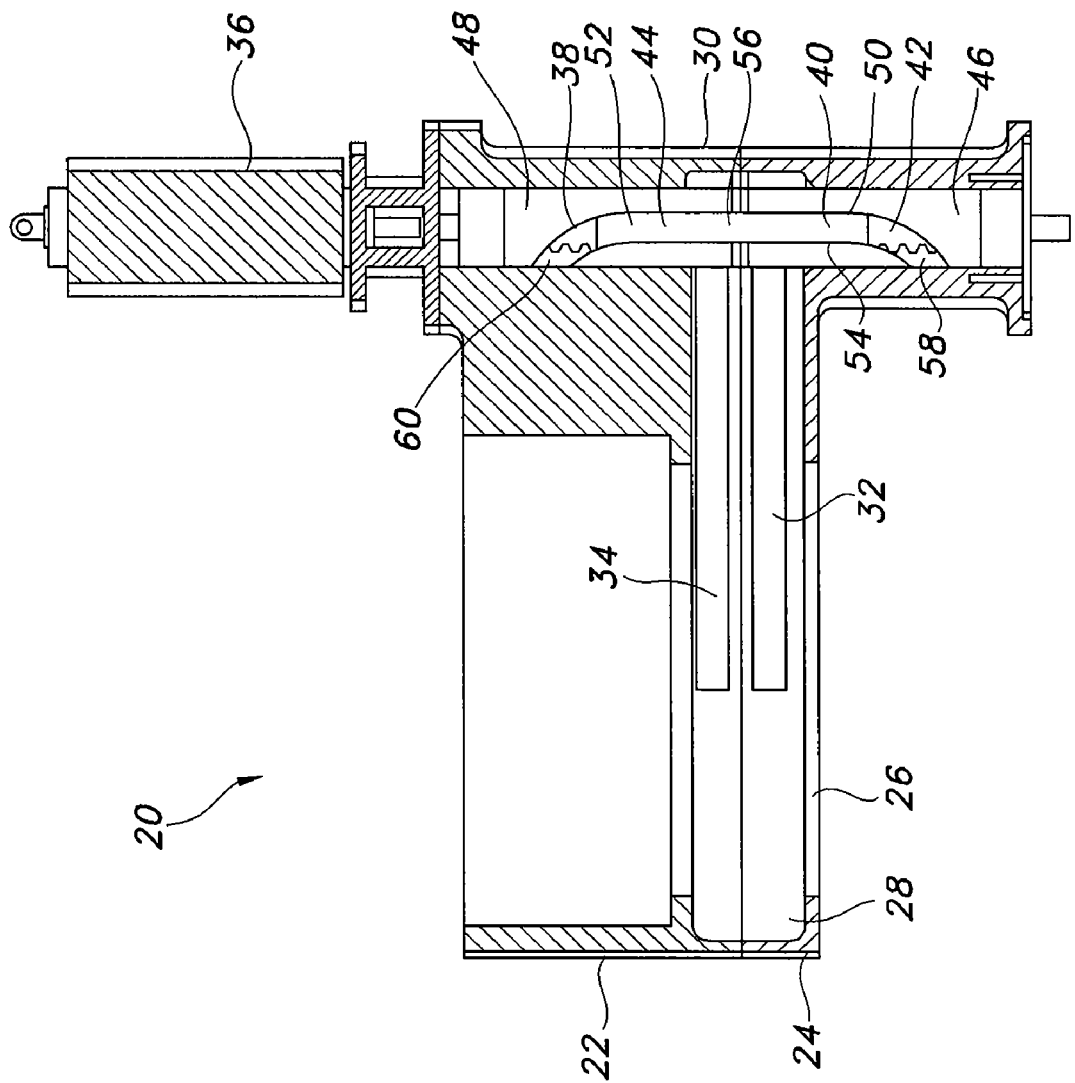
FIG. 4 is a partial section view similar to FIG. 2 but illustrating the drive system with one of the filters in its operative position.
Figure 5:
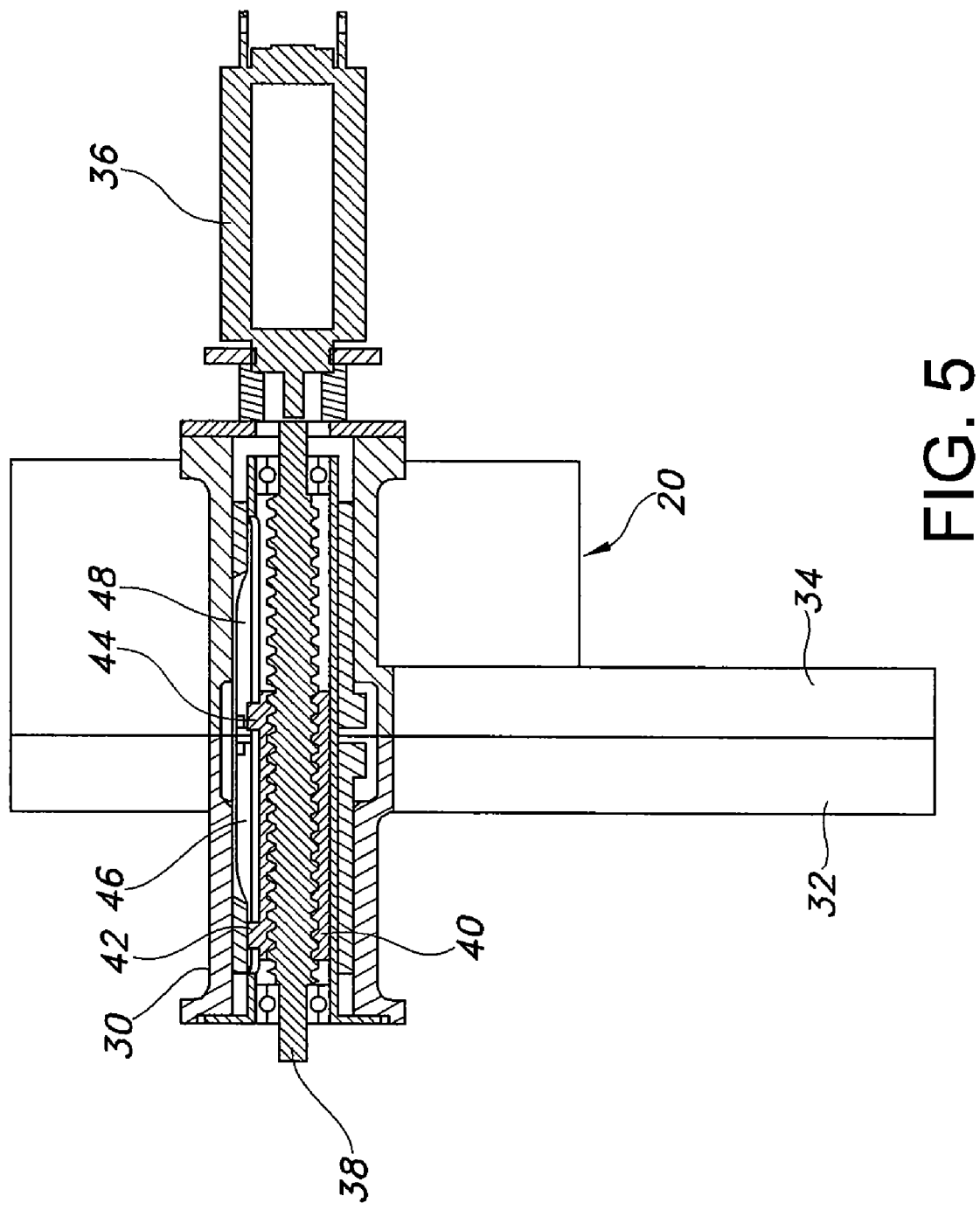
FIG. 5 is a view similar to FIG. 3 but illustrating the drive system with one of the filters in its operative position.

The filter assembly housing also includes a second portion 24 having an opening 26 of the same size and general shape as the objective lens 18 and the opening is adjacent to and in front of the objective lens so that light passes through the opening 26 and is incident on the lens. The second housing portion 24 includes an elliptically or other shaped portion extending below the opening 26 and this second housing portion is formed with an internal recess 28, as best seen in FIGS. 3 and 4. Two laser interference filters 32 and 34, only one of which is partially shown in FIG. 1, are located in the recess 28. Each filter 32 and 34 has a different filtering capability and only one needs to be used depending on the characteristics of the laser light.

The filter assembly housing also includes a second cylindrical portion 30 having an axis extending generally parallel to the first cylindrical portion 22 and, of course, to the monocular 16.

In their inoperative positions, the filters 32 and 34 are located below the objective lens 18 in the recess 28 formed in the second housing portion 24. When one of the filters is required to protect the goggle, the required filter is moved from its inoperative position to an operative position, preferably, in front of the objective lens 18 while the other filter remains in its inoperative position. Light will impinge on the selected filters 32 or 34 and the selected filter is operative to protect the tubes from the laser light. Such filters are known in the art and need not be described here. It is sufficient to note that they allow the ambient light to pass to the objective lens 18 and its image intensification tube while filtering out the laser light.

Referring now to FIGS. 2 through 5 there is illustrated a drive system in accordance with this invention that drives the selected filter from its inoperative to its operative position while leaving the other filter in its inoperative position. This drive system is located in the second cylindrical housing portion 30 and includes a single reversible electric motor 36 which may be located within or outside of the filter assembly housing. The motor 36 is operatively coupled to a threaded lead screw 38 which is rotatably mounted in the housing portion 30. Any suitable coupling between the motor and the lead screw 38 is usable provided that it is operative to rotate the lead screw in either direction depending on the direction of rotation of the motor 36. A nut 40 is carried on the thread formed on the lead screw 38 and, as will be explained, when the lead screw is rotated, the nut translates axially along the screw in one direction or the other depending on the direction of rotation. It can be seen that the nut 40 is an internally threaded elongated member having a pair of pins 42 and 44 or similar protruberances. Each pin 42, 44 extends radially outwardly from the nut's outer surface adjacent the free ends of the nut adjacent the outer ends of the housing portion 30.

Each filter 32 and 34 is formed with or is otherwise operatively coupled to a generally cylindrical sleeve 46 and 48, respectively. Each sleeve extends from the circumferential surface of its associated filter 32 or 34 into the housing portion 30. These sleeves 46 and 48 are generally cylindrical members arranged so that the sleeve is adjacent the screw 38 and preferably encases the screw 38 and the nut 40 to prevent the nut from rotating.

Each sleeve 46 and 48 is formed with a track that cooperates with the pins 42 and 44, respectively, to rotate the selected filter 32 or 34 from its inoperative position to its operative position while it maintains the other filter in its inoperative position. In this embodiment, the tracks are in the form of elongated slots 50 and 52, that extend axially along the length of its associated sleeve 46 and 48, respectively. Each slot 50 and 52 includes an axially extending generally straight segment 54 and 56, respectively, and each axial segment has an open end adjacent the other slot so that the axially extending segments form a continuous track extending through both sleeves 46 and 48. The axial segments 54 and 56 extend generally coextensive with the axial length of the nut 40. At their other end, that is, the ends adjacent the outer ends of the housing portion 30, the slots 50 and 52 are formed with generally arcuate segments 58 and 60, respectively, that extend at an angle to the axial segments 54 and 56 in a direction generally toward the filters 32 and 34, respectively.

Figure 2:
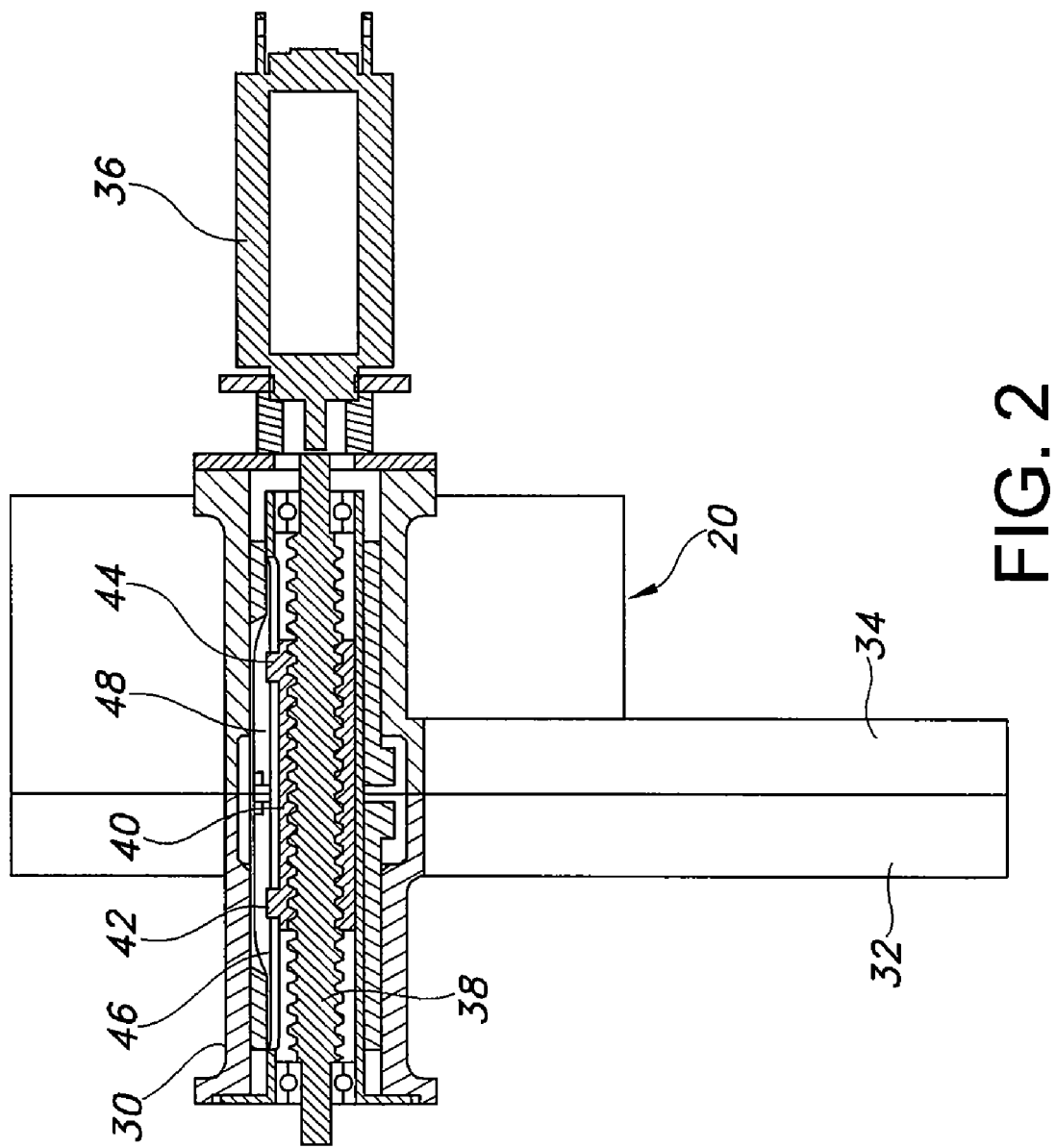
FIG. 2 is a partial section view taken along the line 2-2 of FIG. 1 and illustrating the drive system according to this invention with the filters in their inoperative positions.

As shown in FIGS. 2 and 3, in the inoperative position of the filters 32 and 34, each pin 42 and 44 is located generally adjacent the intersection of its associated axial slot segment 54 or 56 and their respective arcuate segments 58 and 60. Because the pins 42 and 44 are seated in the axial segments 54 and 56 of the slots 50 and 52, rotation of the screw 38 in one direction or the other presents the nut 40 from rotating and drives the nut axially along the screw in a direction dependant on the direction of rotation of the screw 38. As the nut 40 moves, the pins slide along the axial segment 54 and 56 of the slot and the lead pin, pin 42 as shown in FIG. 3, slides into the arcuate segment 58 and rotates the sleeve 46 and its associated filter 32 into its operative position. At the same time, the other pin 44 rides along the straight line segment 56 until it is adjacent the straight line segment 54. Such axial movement of the other pin 44 does not rotate its associated sleeve 48 and its associated filter 34 remains in its inoperative position.

When filter 32 is in its operative position, rotation of the screw 38 in the opposite direction slides the pins 40 and 42 back to the position shown in FIG. 2. As the pin 40 slides along arcuate segment 58 it rotates the sleeve 46 and its associated filter 32 to its inoperative position.

It should be understood that when the filters are in their inoperative position, rotation of the screw 38 in the direction opposite that described above will move the other filter 34 between its inoperative and operative positions in the same manner described for filter 32.

In use, the motor can be operated manually by a suitable switch arrangement or it can be associated with appropriate laser light sensors and software to automatically select and drive the selected filter between its operative and inoperative positions.

While the foregoing describes an exemplary embodiment of the invention, the scope of the invention is recited in the claims appended hereto.

What is claimed:

1. A drive system comprising
a housing, and a screw rotatably mounted in the housing,
a nut operatively arranged on the screw for movement axially along the screw and a pair of optical components each having a rotatable sleeve carried in said housing adjacent the nut;
said nut having a pin adjacent each end thereof and each sleeve having a track formed along its axial length, each pin being operatively arranged with a different one of the tracks, each track being configured so that upon axial movement of the nut one pin holds one sleeve against rotation and the other pin rotates the other sleeve whereby the optical component associated with the other sleeve rotates between a first and a second position.

2. A drive system in accordance with claim 1 wherein each track has a first segment extending generally parallel to the axial direction of the screw and a second segment extending at an angle thereto.

3. A drive system in accordance with claim 1 wherein each track is a slot formed on its associated sleeve and wherein each of said pins is slideable in one of said slots, each slot having a first segment extending generally parallel to the axial direction of the screw and a second segment extending at an angle to said first segment in a direction toward the optical component.

4. A drive system in accordance with claim 3 wherein the first segment of each slot is adjacent the first segment of the other slot and wherein the second segment of each slot is spaced from the other second segment by the first segment.

5. A drive system in accordance with claim 1 wherein each optical component is a laser interference filter, each filter having an operative and an inoperative position.

6. A drive system in accordance with claim 1 including a motor coupled to said screw for rotating said screw in either direction.

7. A night vision device comprising:
- a night vision goggle amplifying low levels of light, a pair of laser light filters operatively arranged with said goggle to protect said goggle from laser light, and a drive system moving either of said filters between an inoperative and an operative position;
- said drive system including a housing carried on said goggle, a screw rotatably mounted in said housing, a nut operatively arranged on the screw for movement axially along the screw, and a rotatable sleeve extending from each of said filters;
- each sleeve carried in the housing adjacent one of the nuts and each sleeve formed with a track extending along its axial length;
- said nut having a pin on each axial end thereof and each pin being slidable in one of the tracks as the nut moves axially along the screw to rotate one of the sleeves while maintaining the other sleeve against rotation whereby the filter associated with the rotating sleeve moves between its operative and inoperative positions.

8. A drive system in accordance with claim 7 wherein each track has a first segment extending generally parallel to the axial direction of the screw and a second segment extending at an angle thereto.

9. A drive system in accordance with claim 7 wherein each track is a slot formed on its associated sleeve and wherein each of said pins is slideable in one of said slots, each slot having a first segment extending generally parallel to the axial direction of the screw and a second segment extending at an angle to said first segment in a direction toward the laser light filters.

10. A drive system in accordance with claim 9 wherein the first segment of each slot is adjacent the first segment of the other slot and wherein the second segment of each slot is spaced from the other second segment by the first segment.

11. A drive system in accordance with claim 7 including a motor coupled to said screw for rotating said screw in either direction.

12. A night vision device comprising:
- a night vision goggle amplifying low levels of light, a pair of laser light filters, each filter being rotatable between an operative position to protect said goggle from laser light damage and an inoperative position, and a drive system for rotating one filter between its operative and inoperative positions while retaining the other filter in its inoperative position;
- said drive system comprising a housing carried by the goggle, a screw rotatably mounted in said housing, a motor operatively arranged to rotate the screw in either direction, a nut carried on the screw for movement axially along the screw;
- said nut having a pair of pins extending radially therefrom, one pin being located at one axial end of the nut and the other pin begin located at the other axial end of the nut;
- each filter being formed with a sleeve located in the housing adjacent said nut, each sleeve being formed with a track extending axially along its length, each track having a first elongated segment extending from the end of its associated sleeve adjacent the other sleeve, the first elongated segment being in communication with each other, each track further including a second segment adjacent the other end of its associated sleeve extending at an angle to the first segment toward the filter associated with its associated sleeve;
- each pin extending into the first segment of the track of its adjacent sleeve when each filter is in its inoperative position, rotation of the screw in one direction moves the nut in a first direction so that the one pin slide along the first segment of its associated track and the other pin slides into the second segment of its associated track and rotates that track's sleeve and filter to its operative position.

\* \* \* \* \*